United States Patent [19]
Waterfield

[11] 4,319,737
[45] Mar. 16, 1982

[54] DIAPHRAM VALVE

[75] Inventor: Timothy O. W. Waterfield, Chandler's Ford, England

[73] Assignee: Waterfield Engineering Limited, Hampshire, England

[21] Appl. No.: 102,813

[22] Filed: Dec. 12, 1979

Related U.S. Application Data

[63] Continuation of Ser. No. 900,393, Apr. 26, 1978, abandoned.

[51] Int. Cl.³ .............................................. F16K 7/12
[52] U.S. Cl. ..................................... 251/331; 137/375
[58] Field of Search ......................... 251/331; 137/375

[56] References Cited

U.S. PATENT DOCUMENTS

| | | | |
|---|---|---|---|
| 1,992,043 | 2/1935 | Saunders | 251/331 X |
| 2,236,253 | 3/1941 | Testori | 251/331 X |
| 2,605,991 | 8/1952 | Kaye | 251/331 |
| 2,725,211 | 11/1955 | Boteler | 251/331 X |
| 2,988,322 | 6/1961 | Anderson | 251/331 |
| 3,103,342 | 9/1963 | Boteler | 251/331 |
| 3,310,280 | 3/1967 | Boteler | 251/331 |
| 3,426,999 | 2/1969 | Toinet | 251/331 |
| 3,811,649 | 5/1974 | Press et al. | 251/331 |
| 3,918,495 | 11/1975 | Abrahams | 251/331 X |

FOREIGN PATENT DOCUMENTS

| | | | |
|---|---|---|---|
| 1271905 | 8/1961 | France | 251/331 |
| 808074 | 1/1959 | United Kingdom | 251/331 |
| 926129 | 5/1963 | United Kingdom | 251/331 |

*Primary Examiner*—Arnold Rosenthal
*Attorney, Agent, or Firm*—Sughrue, Mion, Zinn, Macpeak and Seas

[57] ABSTRACT

A diaphragm valve has a body defining a fluid passageway and, in the wall of the body, an opening in communication with the fluid passageway. A diaphragm for controlling fluid flow through the passageway extends across the opening and its periphery is clamped between the body and a bonnet secured to the body. Around the opening in the body is a diaphragm seating formed by two flat surfaces inclined relative to each other so as to be divergent. The bonnet is also provided with a diaphragm seating which comprises two flat surfaces inclined relative to each other so as to converge at the bottom end of the bonnet. The diaphragm seating is such as to provide a straight-through fluid passageway which, at each end of the body, is of circular section, these sections being joined by an elliptical or substantially elliptical section.

11 Claims, 9 Drawing Figures

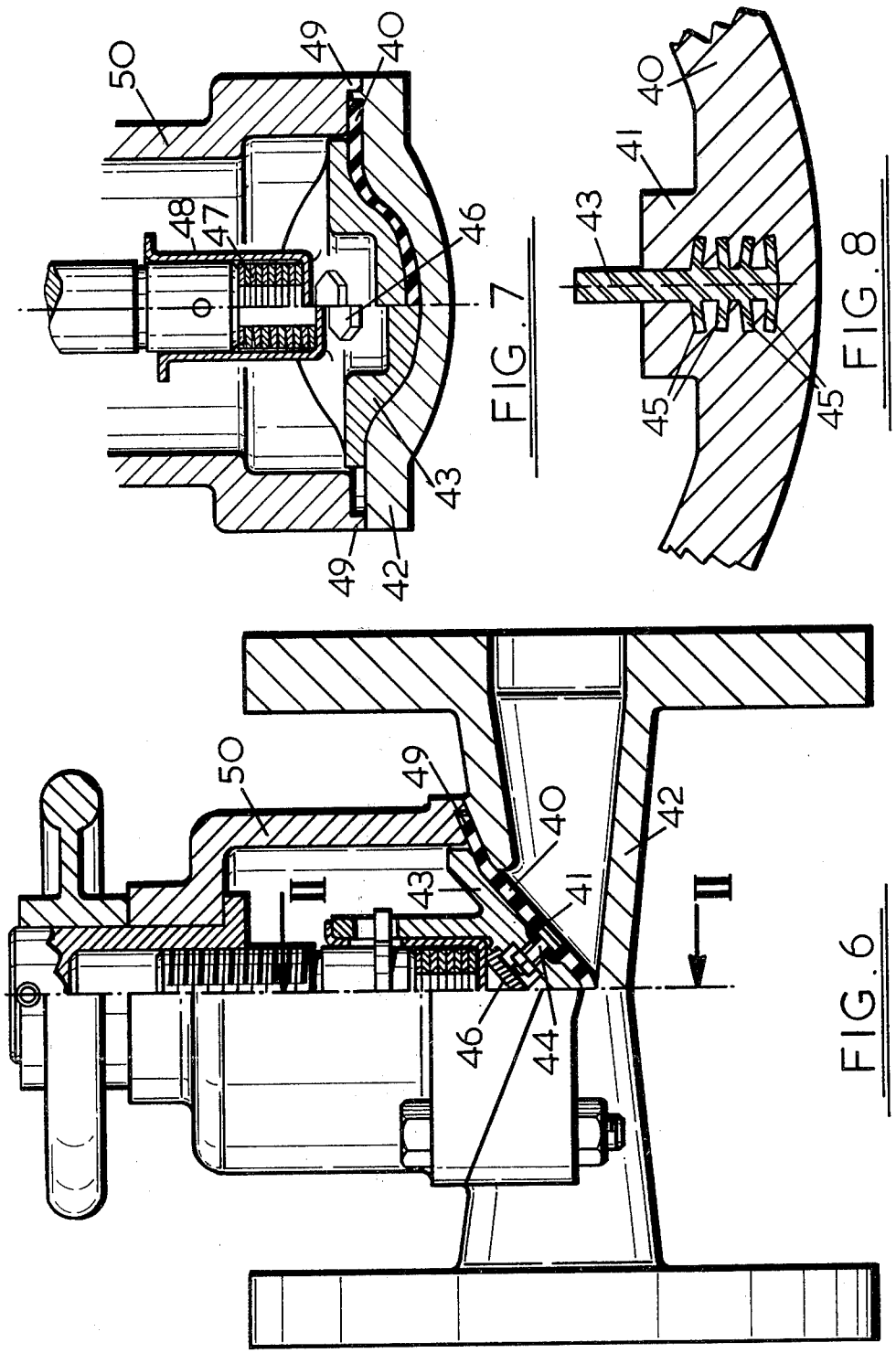

DIAPHRAM VALVE

This is a continuation, of application Ser. No. 900,393, filed Apr. 26, 1978.

This invention relates to a diaphragm valve in which at least part of a diaphragm is movable within a body defining a fluid passageway to prevent or restrict the passage of fluid therethrough.

Such a diaphragm valve usually has an opening in the body communicating with the passageway, the diaphragm extending across the opening in the body to prevent leakage to and from the atmosphere and to isolate the valve operating mechanism from the fluid. A bonnet assembly which houses the operating mechanism is bolted to the body with the periphery of the diaphragm clamped between the bonnet and the body. Such a valve may be manually operated or remotely operated by hydraulic, pneumatic or electrical means.

According to the present invention there is provided a diaphragm valve comprising a body traversed by a fluid passageway and having an opening in communication with the passageway, a diaphragm for controlling fluid flow through the passageway and extending across the opening, and a bonnet secured to the body with the peripheral portion of the diaphragm clamped between the bonnet and body, the body being provided around the opening with a diaphragm seating formed by two flat surfaces which extend normal to the passageway and are inclined relative to each other so as to be divergent, and the bonnet being provided with a diaphragm seating comprising two flat surfaces which are inclined relative to each other so as to converge at the bottom end of the bonnet.

Such an inclined clamping arrangement exerts an even clamping force on the periphery of the diaphragm independently of the magnitude of the gap between the flat surfaces.

Most importantly, the use of the inclined clamping arrangement permits the production of the diaphragm valve with straight through fluid flow.

An embodiment of the invention will now be described, by way of an example, with reference to the accompanying drawings in which:

FIG. 6 is a side elevation, partly in cross-section of a modification of the diaphragm valve;

FIG. 7 is a fragmentary detail view of the valve of FIG. 6 showing diaphragm destruction;

FIG. 8 is a detail of a diaphragm-securing stud; and

Figure 1:
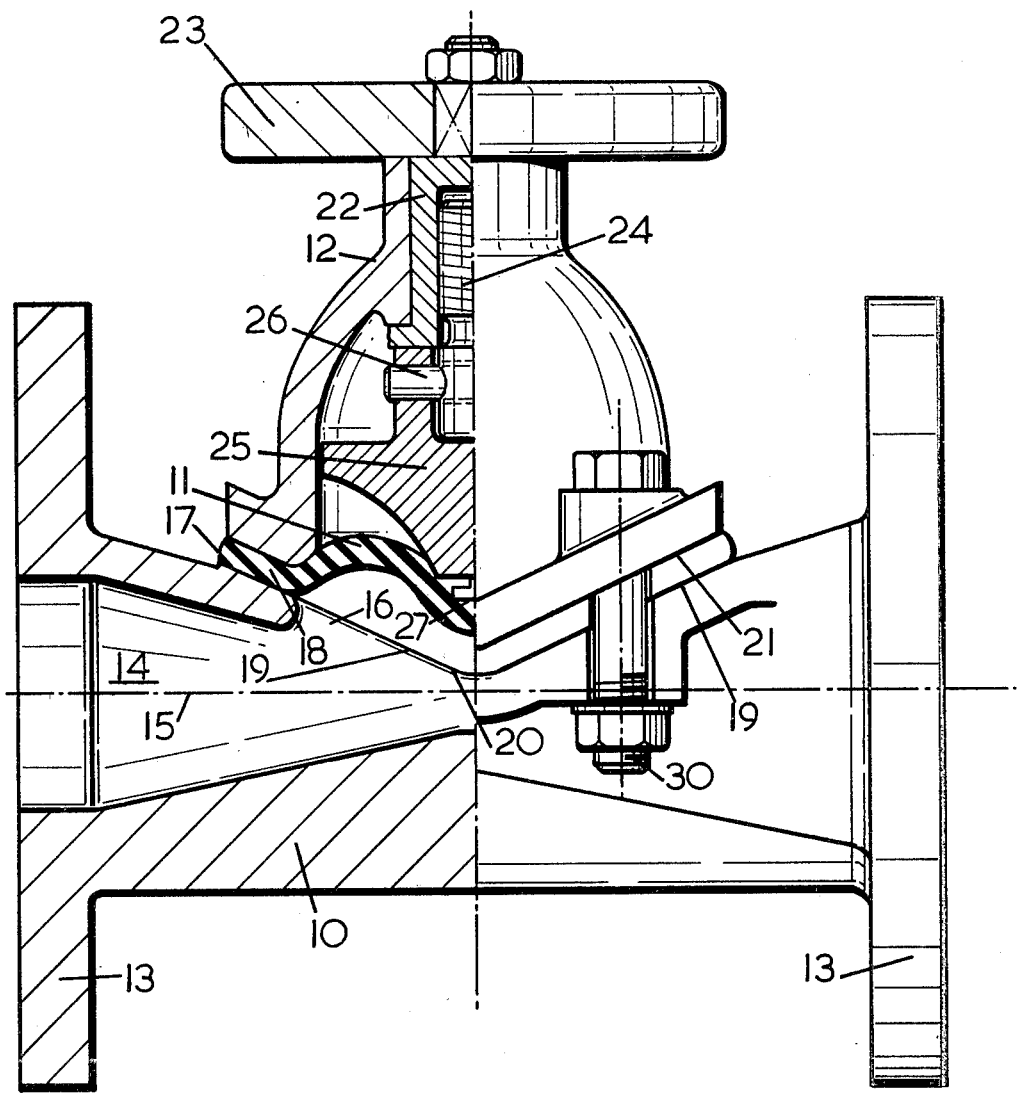
FIG. 1 is a side elevation, partly in cross-section, of a diaphragm valve according to the present invention.
Figure 2:
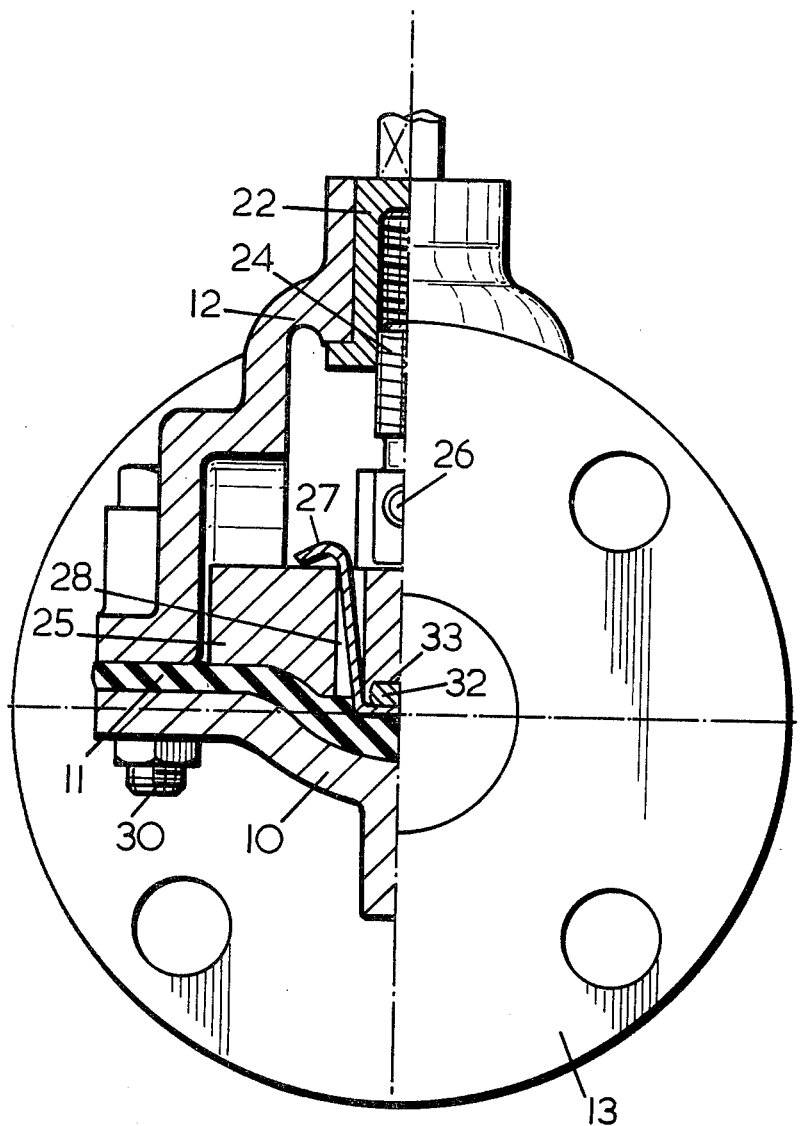
FIG. 2 is an end view, partly in section, of the diaphragm valve of FIG. 1.

The diaphragm valve of FIGS. 1 to 4 comprises a body 10, a flexible diaphragm 11 and a bonnet 12. The body 10 is provided with end flanges 13 and a passageway 14 having a straight longitudinal axis 15. At each end region the passageway 14 is circular and this merges to an elliptical or substantially elliptical cross-section in its mid-length region. The configuration of the passageway between the circular inlet section and the elliptical mid-length section has been found to give much higher Cv values than known diaphragm valves when the valve is opened to a predetermined degree. The body 10 is provided with an opening 16 which may be oval or circular and which communicates with the passageway 14 and is surrounded on the outside of the body 10 by a seating 17 against which a peripheral flange portion 18 of the diaphragm 11 seats. The seating 17 is formed by two flat surfaces 19 which are inclined relative to each other and diverge upwardly as viewed in FIG. 1. The flat surfaces 19 are joined together by curved surfaces 20.

The peripheral portion 18 of the diaphragm 11 seats on the surfaces 19 and 20 and the diaphragm 11 extends across the opening 16. The diaphragm 11 can be formed from any suitable elastomeric material, such as natural or synthetic rubber or a flexible plastics material and it may be reinforced by a suitable fabric. The diaphragm 11 may be of a composite construction, i.e. rubber faced with a plastics material such as polytetrafluoroethylene. Although some of these materials are not compressible in the true sense of this word the term "compression" used in the specification is intended to describe what is really a displacement of elastomer. The required compression of the peripheral portion 18 will vary with the type of elastomer and reinforcing fabric used, the pressure or vacuum in the passageway 14, the finish of the body material (plain cast iron or glass lined) and manufacturing errors. As an example the compression of a natural rubber diaphragm 11 fitted to a cast iron body 10 will be approximately 20%.

The bonnet 12 is substantially bell-shaped and at its bottom end it is provided with flat surfaces 21 which are inclined relative to each other so as to converge at the bottom of the bonnet 12. The angle of inclination of the surfaces 21 is identical with that of surfaces 19. Housed in the bonnet 12 is the operating mechanism which consists of a bush 22 which is rotatably mounted in the bonnet 12 and is connected to a handwheel 23. The bore of the bush 22 is screw-threaded and in screw-threaded engagement therewith is a screw-threaded spindle 24. Mounted on the lower end of the spindle 24 is a member 25 which is secured thereto by a pin 26. Fixed to the diaphragm 11 is a substantially U-shaped retainer member 27, the two limbs of which extend through holes 28 in the member 25 and are bent over at their outer end to hold the diaphragm 11 on the member 25. In FIG. 1 the operating mechanism and diaphragm 11 are shown in the valve open position and in FIG. 2 the operating mechanism and diaphragm 11 are shown in the valve closed position.

Figure 5:
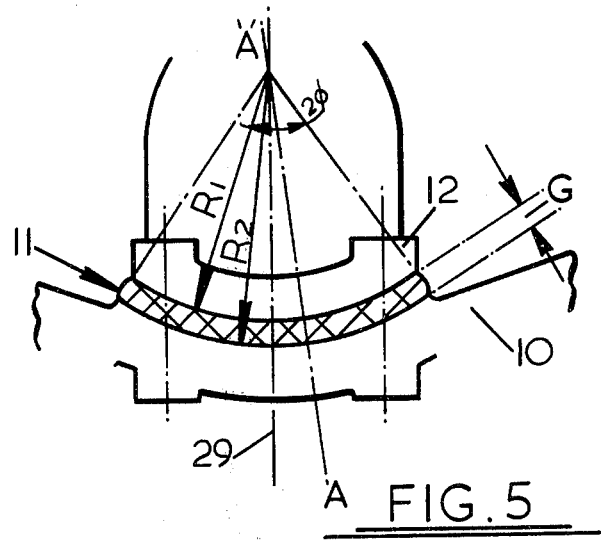
FIG. 5 is a diagrammatic side elevation of a known diaphragm valve provided with curved seating surfaces.

It is desirable that when the bonnet 12 is bolted to the body 10 there is the minimum of compression of the diaphragm 11 at its peripheral flange 18, consistent with sealing to atmosphere and preventing the edges of the diaphragm 11 being pulled inwardly when there is pressure inside the valve, in order to extend the life of the diaphragm 11. This can be obtained with flat clamping flanges of the bonnet 12 and body 10 but is virtually impossible where the flanges are curved about an axis struck from the axis of the bonnet 12 as is well known in the prior art and as shown in FIG. 5. In the known arrangement shown in FIG. 5 the clamping faces of the bonnet 12 and body 10 are curved about respective radii R1 and R2. This produces an even clamping force for only one value of G which is the gap between the curved surfaces of the bonnet 12 and body 10. In practice G is not constant along the flanges of bonnet 12 and body 10. The variations in G along the flanges are large and the angle $2\phi$ can be as large as 130°. This uneven clamping force exerts high local stresses on the flange of the body 10 which if the body 10 is lined with glass can cause the lining to crack.

Figure 3:
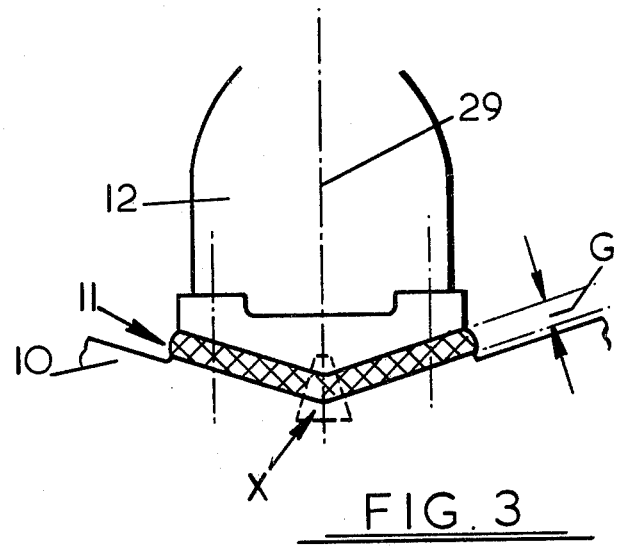
FIG. 3 is a partial side elevation of the diaphragm valve of FIG. 1.

With the V-shaped clamping surfaces of the valve according to the present invention as shown in FIG. 3 an even clamping gap can be provided along the flanges except in the region X shown in FIG. 3 which corresponds with the small radius 20 at the apex of the Vee. In this region X only a small volume of elastomer is involved and the surrounding elastomeric material will accommodate to maintain an even clamping pressure throughout the flange 18 of the diaphragm 11.

The V-shaped clamping surfaces automatically give a true positioning of the bonnet assembly 12 relative to the body 10 whereas in the known valves having curved clamping surfaces there is no automatic positioning of the bonnet assembly 12 on the body 10. With a curved seating the bonnet assembly 12 can be offered up to the body 10 askew, i.e. with the central axis 29 of the bonnet assembly 12 lying along line A—A instead of on the centre-line 29. The provision of the V-shaped clamping surfaces greatly simplifies the design of body 10 and diaphragm 11 compared with the provision of curved surfaces. The choice of suitable curvature of the curved surfaces is complex compared with flat surfaces, the most desirable radius for the curve being difficult to determine as there are certain reference points that it should pass through. In the case of V-shaped clamping surfaces these reference points can be made to lie along the two straight lines of the Vee.

Figure 4:
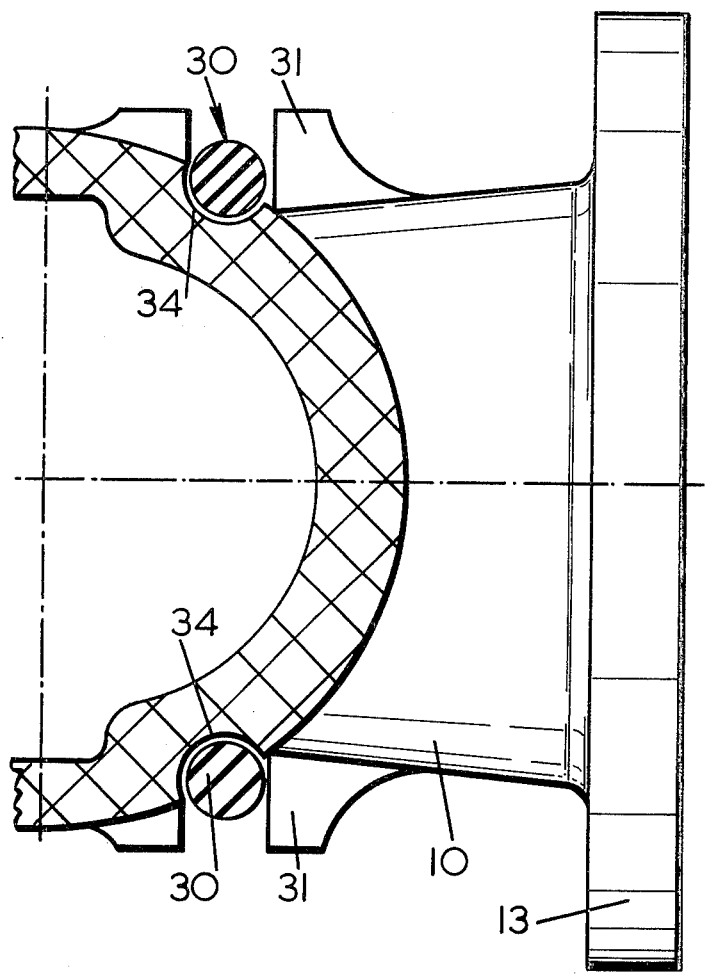
FIG. 4 is a partial plan view of the body showing the seating surface for the diaphragm.
Figure 9:
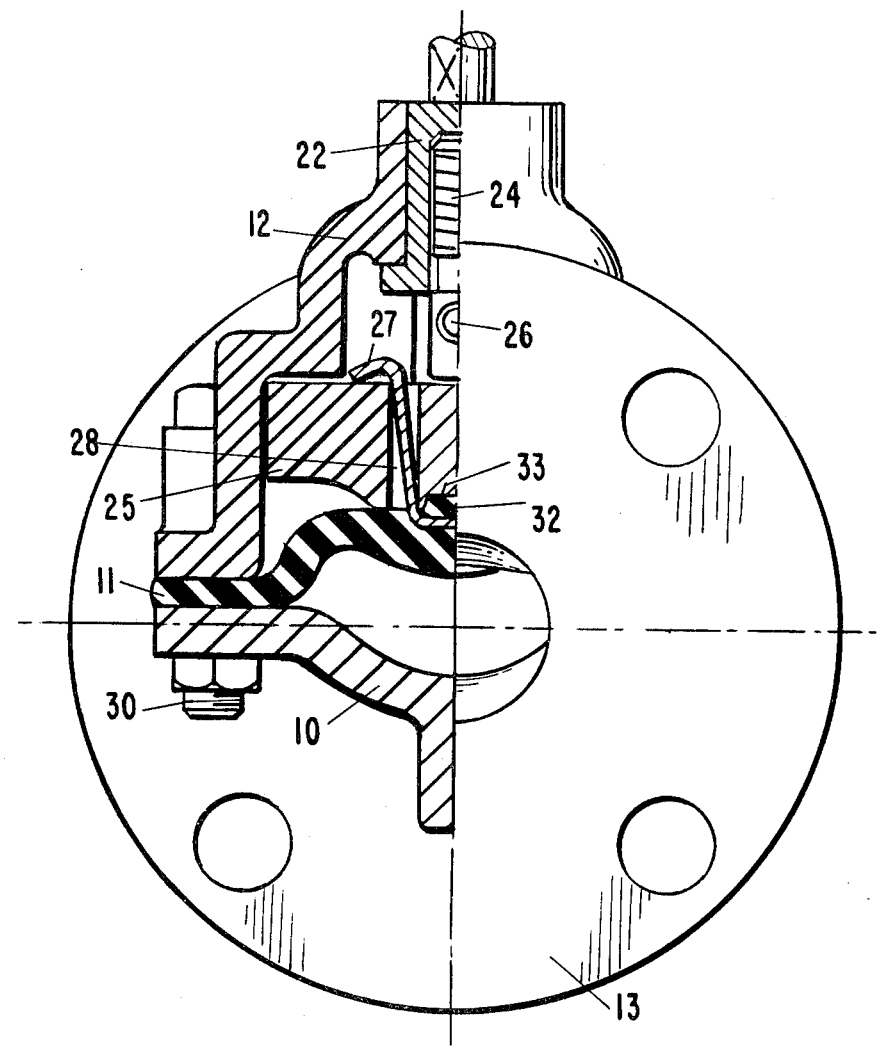
FIG. 9 is a view similar to FIG. 2, with the valve opened, and illustrating partially the interior flow passage of the valve.

In view of the self-locating of the bonnet assembly 12 and diaphragm 11 relative to the body 10 due to the V-shaped clamping surfaces it is possible to eliminate accurate drilling of holes in the body 10 and bonnet 12 for the clamping bolts 30 as the clamping bolts 30 do not have to locate the parts 10, 11 and 12 relatively to each other as in the case of valves provided with curved clamping surfaces or wholly flat clamping surfaces. As shown in FIG. 4 the body 10 can be provided with cast lugs 31 to receive the bolts 30. The V-shaped clamping surfaces locate the bonnet 12 and diaphragm 11 longitudinally of the body 10 during assembly and transverse location is obtained when the bolts 30 are tightened because the assembly is made with the member 25 in the valve closed position. The elimination of drilling holes in the body 10 is important where the body 10 is lined with rubber, ceramic, plastics material or glass as the lining can be cracked when any holes which contain lining material are cleaned out.

It is known to produce diaphragms 11 with a flat peripheral flange 18 which becomes curved on final assembly to the body 10. Modern diaphragms 11 are provided with a reinforcing fabric and can also have a covering of plastics material so that there are problems in causing the flat peripheral flange 18 to become curved. If the peripheral flange 18 of the diaphragm 11 is moulded in a curved shape then it is difficult and expensive to produce. The diaphragm 11 used in the valve according to the present invention has the flat peripheral flange 18 kinked in its centre so that it can easily take up the V-shape. The diaphragm 11 can therefore be moulded with a flat flange 18 with considerable advantages in using cheaper moulds and can be faced with a plastics material. By moulding a diaphragm 11 with a flat flange 18, the magnitude of the maximum stress in the elastomer is reduced, the maximum stress occurring when the diaphragm 11 is fully closed. In the present invention the action of folding the flat flange 18 on assembly induces stresses in the elastomer which are relieved when the valve is closed, resulting in stresses of a lower magnitude. This will result in reduced closure effort and longer diaphragm life. It is possible to produce the diaphragm 11 as a standard diaphragm which can be used for different amounts of opening. The standard diaphragm 11 is moulded so that it is unstressed in the open position for standard use. However such a diaphragm can be opened further than the standard use where a valve has to give the maximum throughput.

Known diaphragms are usually connected to the member 25 by a screw-threaded stud having a head buried in the centre of the diaphragm. The stud engages in a tapped hole in the member 25. The end of the U-shaped retainer member 27 can be buried in the diaphragm 11 well away from the face which in use is in contact with the fluid in the valve and the normal drilled and tapped hole which requires two machining operations is replaced by the two holes 28 which can have a wide tolerance requiring only one machining operation. The diaphragm 11 is accurately positioned on the member 25 by a lozenge shaped boss 32 locating in a cast recess 33 provided in the member 25.

As shown in FIG. 4, the clamping area is of substantially regular width and the diaphragm 11 is provided with recesses 34 for the bolts 30 instead of holes. This eliminates the need to drill holes in the diaphragm 11 after moulding. Any leakage of fluid from the valve is visible before it comes into contact with the bolts 30. With conventional diaphragms 11 there can be a leakage down the bolt holes and this is difficult to detect.

It is envisaged that the diaphragm may be constructed as an elastomeric backing material bonded to a ductile metal such, for example, as lead or copper. Alternatively, the diaphragm may be formed wholly of a ductile metal or hard plastics material without any elastomeric material between the member 25 or 43 and the diaphragm.

Referring now to FIGS. 6 to 8 there is shown a diaphragm valve incorporating the principle of the present invention but additionally having the feature that sealing of the valve is maintained, i.e. no leakage to atmosphere, even if the diaphragm is destroyed due to, for example, abrasion, chemical attack or fire.

In this instance, it can be seen that the rubber diaphragm 40 has areas 41 of greater thickness than the general thickness of the diaphragm, which areas 41 are inboard of the diaphragm periphery and are remote from the sealing line between the body 42 and the diaphragm compressing member 43 when the valve is closed.

The diaphragm 40 is secured to the members 43 at the areas 41 by studs 44. The positioning of the securing studs 44 in the side of member 43 has the advantage that the mechanical interlock between diaphragm and stud has a better resistance to destruction than the case where the stud is centrally located where an upward vertical force would tend to pull the stud out of the diaphragm 40.

The mechanical interlock between stud and diaphragm is substantially improved if the stud 44 is formed with a number of spaced discs 45 between which the diaphragm material can flow. Such a stud 44 would be machined with the discs 45 parallel and they would then be dished as shown after coating with a bonding chemical. It will be manifest that this stud construction can be used in any other situation where a stud is called for and is not limited in use to the diaphragm valve of the present invention.

The member 43 is preferably provided with a secondary seal which becomes effective as the diaphragm 40 is destroyed. This secondary seal is formed of a non-destructible material, such for example as asbestos, copper or aluminium. Such sealing material may be set into a machined groove in the member 43 or may be incorporated in the valve body 42.

Additionally, the diaphragm-adjacent face of the member 43 may be provided with gasketting or other sealing material.

A seal of non-destructible material is preferably also provided between bonnet and body, i.e. between the body 42 and lip 49 hereinafter referred to, suitable recessing in the body and/or lip preferably being provided to accommodate same.

Upon diaphragm destruction, therefore, the secondary seal comes into play and there is thus no loss in fluid control nor leakage to atmosphere. Leakage through the stud holes in the member 43 is prevented by the provision of sealing caps 46.

A spring arrangement 47 held in a cap 48 urges the member 43 and body 42 into sealing engagement upon diaphragm destruction.

It can be seen from FIGS. 6 and 7 that the peripheral edge of the diaphragm 40 is shrouded by a depending lip 49 of the bonnet 50. This lip 49 also assists in ensuring no leakage from the valve upon valve destruction.

The V-shaped clamping surfaces of the body and bonnet of the above described valves gives the advantage that they are easier to produce compared with those having curved clamping surfaces. The patterns and jigs are easier to produce due to the flat surfaces, production standards can be more easily maintained and there is a saving on machining and assembly time.

While reference has been made to straight through fluid flow it is to be clearly understood that the scope of this invention includes non-straight through fluid flow arrangements.

In the above described diaphragm valves, the diaphragm seating faces on the valve body and the complementary flat faces on the bonnet are symmetrically disposed about a plane centrally traversing the valve. This need not be so and a non-symmetrical arrangement is envisaged by the present invention.

By suitably offsetting these faces and mounting the valve with the bonnet axis horizontal there can be obtained a self-draining valve.

What is claimed is:

1. A diaphragm valve comprising a body traversed by a fluid passageway and having an opening in communication with the fluid passageway, a diaphragm for controlling fluid flow through the passageway and extending across the opening, a bonnet secured to the body by a plurality of bolts with the peripheral portion of the diaphragm clamped between the body and bonnet, and a mechanism carried by the bonnet and connected to the diaphragm for moving same between valve closed and valve opened positions, the body being provided around the opening with a diaphragm support face formed by two flat seating surfaces which are inclined relative to each other so as to be divergent in the direction toward said bonnet and which are joined together by curved surfaces to provide for self location of the diaphragm relative to the opening of the body when the bonnet and diaphragm are assembled onto the body with said mechanism in valve closed position, said flat surfaces forming a major part of the entire support surface area of said diaphragm support face, and the bonnet being provided with a diaphragm clamping face comprising two flat surfaces which are inclined relative to each other so as to converge at the bottom end of the bonnet, characterized by the bonnet being formed with a plurality of holes and the body having an equal plurality of complementary, open-sided cast lugs for receiving the bolts.

2. A valve as claimed in claim 1 in which the diaphragm support face of the body is configured to provide a straight-through fluid passageway.

3. A valve as claimed in claim 2, in which the body is configured to provide at each end a circular section passageway joined by an elliptical section passageway.

4. A valve as claimed in claim 3, in which the opening is of circular shape.

5. A valve as claimed in claim 4, in which the bonnet houses a valve-operating mechanism including a member secured to the diaphragm and movable normally to the longitudinal axis of the passageway to control opening of the latter through the intermediary of the diaphragm.

6. A valve as claimed in claim 5, in which the diaphragm is formed with a flat peripheral flange which is clamped between the inclined flat surfaces of the body and bonnet and which is kinked along its center to conform with the configuration determined by said surfaces.

7. A valve as claimed in claim 6 in which the diaphragm is formed of a textile reinforced elastomeric material.

8. A valve as claimed in claim 6 in which the diaphragm is formed of rubber faced with a plastics material.

9. A valve as claimed in claim 6 in which the diaphragm comprises an elastomeric backing bonded to a ductile metal.

10. A valve as claimed in claim 6 in which the diaphragm is made wholly of a ductile metal.

11. A valve as claimed in claim 1, in which the diaphragm is recessed in the regions of the bolts.

\* \* \* \* \*